United States Patent [19]

Chinnock et al.

[11] Patent Number: 4,977,929
[45] Date of Patent: Dec. 18, 1990

[54] WEIR VALVE SAMPLING/INJECTION PORT

[75] Inventors: Robert T. Chinnock, Victoria; Jeffrey J. McKenzie, Watertown, both of Minn.

[73] Assignee: Fluoroware, Inc., Chaska, Minn.

[21] Appl. No.: 372,647

[22] Filed: Jun. 28, 1989

[51] Int. Cl.⁵ .............................................. F16K 7/12
[52] U.S. Cl. ..................................... 137/863; 251/331
[58] Field of Search ................ 251/331, 145; 137/863, 137/861

[56] References Cited

U.S. PATENT DOCUMENTS 4,653,526  3/1987  Hoiss ............................... 251/331 X

FOREIGN PATENT DOCUMENTS 633144  10/1927  France ................................. 251/331

OTHER PUBLICATIONS

Saunders, product brochure, "Saunders Pneumatic Valve Actuators", 40 pages (undated).
Saunders, product brochure, "Saunders Diaphragm, Check and Butterfly Valves", 16 pages (pp. 1-11 and 4 covers enclosed (undated).
Armaturen in Kunststoff und Metal, product brochure, "Plastic and Metal-Valves and Flowmeters", 7 pages (undated).
GF, product brochure, "Process Controls", (pages cover and 17) (undated).
Posacon, product brochure "Membranventile PFA--System", 14 pages (undated).
ITT Fluid Products Corporation, product brochure, "Advantage ITT Engineered Valves", 4 pages (undated).
ITT Engineered Valves, Unit of ITT Fluid Tech. Corp., product brochure, "Diaphragm Valves for Sanitary Systems" 16 pages (undated).

Primary Examiner—Alan Cohan
Attorney, Agent, or Firm—Palmatier & Sjoquist

[57] ABSTRACT

The present weir valve includes a weir disposed along a flow passage. A port at the other side of the weir is open to the flow passage when the diaphragm is lifted off the weir.

3 Claims, 2 Drawing Sheets

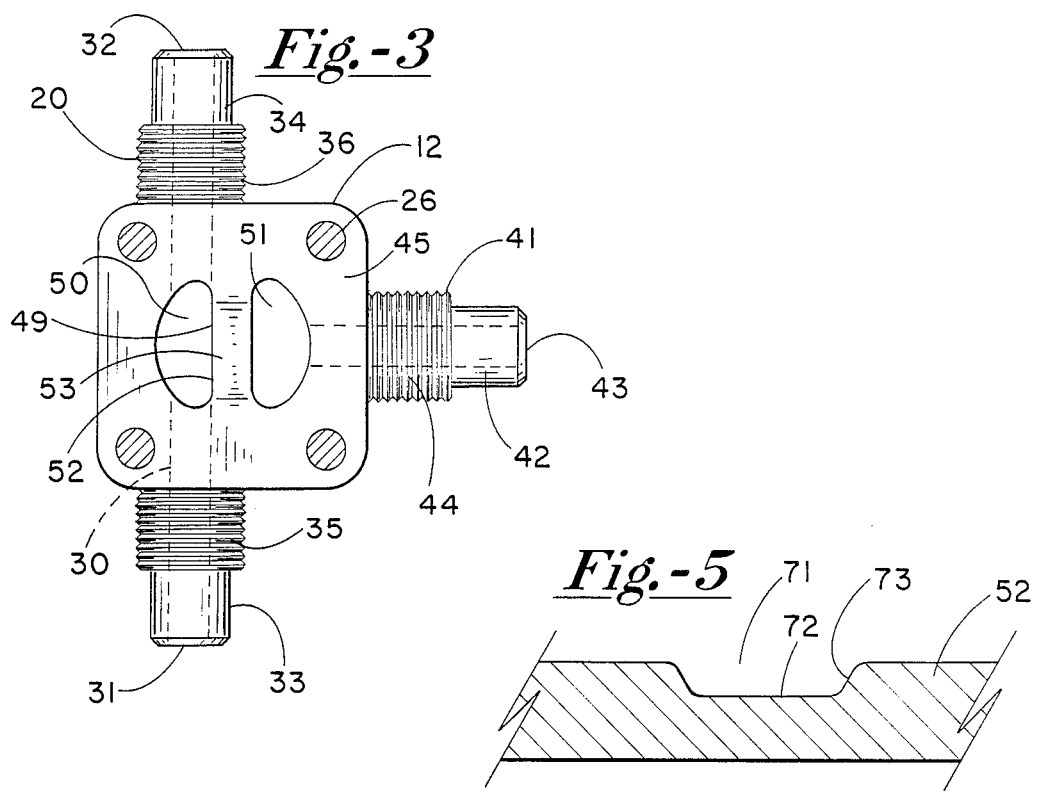
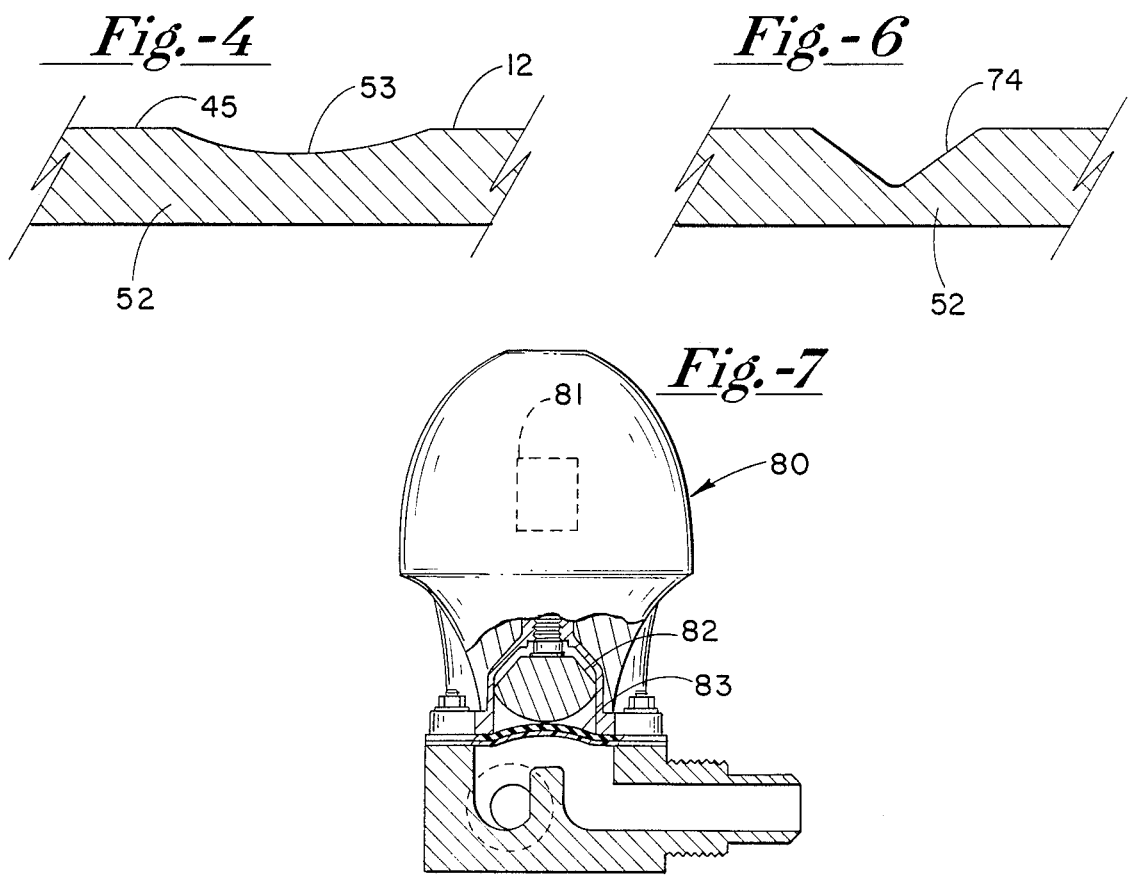

WEIR VALVE SAMPLING/INJECTION PORT

The present invention relates to weir valves and, more particularly, to a weir valve for sampling or supplementing a flowing liquid.

BACKGROUND OF THE INVENTION

A weir valve is a valve utilizing a resilient diaphragm to traverse a weir and prevent flow of fluid over the weir. The diaphragm may be lifted off the weir, either hydraulically when released, or mechanically to permit flow over the weir.

One reason a weir valve may be desirable is that its working mechanical parts are isolated from fluid flowing through the valve. Hence, weir valves are found in the biotechnological, pharmaceutical, chemical, food processing, beverage, cosmetic, and dairy industries where protection against product contamination and leakage to the valve, workplace or atmosphere are important considerations.

In such industries, it may be desirable to take samples of, or inject components into, chemicals, beverages or other products flowing through pipes. In certain instances, some liquids are subject to be degraded or changed if full flow is not continuous. Such change or degradation may occur if pockets, dead spaces or quiescent areas exist along the flow lines.

SUMMARY OF THE INVENTION

A feature of the present invention is a weir valve peculiarly adapted for removing samples from or injecting supplements into a full flowing liquid in a flow passage. Of particular importance is the avoidance of any dead areas or quiescent locations between the flow passage and the place at which samples are taken or supplements are injected.

Another feature of the present invention is the provision in valve housing of an open interior traversed by a weir separating a flow passage on one side of the weir from a flow port at the other side of the weir. A diaphragm traverses the top of the weir, preventing flow over the weir. The diaphragm may be released to lift under hydraulic pressure, or be lifted off the weir to permit fluid flow over the weir. Flow over the weir in one direction from the passage permits taking a sample at the port; and flow over the weir in the other direction permits injecting a supplement from the port and into the flowing fluid.

Another feature of the present invention is that the weir forms one side of the flow passage, thus preventing the formation of any dead space or quiescent areas for the flowing fluid which moves along the weir.

An advantage of the present invention is that there is practically no space for entrapment of fluid during sampling or injection operations.

Another advantage of the present invention is that there is no dead volume of chemical for sampling and injection operations.

Another advantage of the present invention is that true samples may be obtained that are representative of the composition of the fluid flowing through the pipe at the time the sample was taken.

Another advantage is that chemicals may be injected accurately into a desired portion of even a rapidly flowing fluid stream.

BRIEF DESCRIPTION OF THE DRAWINGS

FIG. 3 is a detail section view at lines 3—3 of FIG. 2.

FIG. 4 is a diagrammatic view of one of the preferred embodiments of the weir seat.

FIG. 5 is a diagrammatic view of another preferred embodiment of the weir seat.

FIG. 6 is a diagrammatic view of another preferred embodiment of the weir seat.

FIG. 7 is an elevation view of a power operated weir valve incorporating the present invention.

DETAILED DESCRIPTION OF THE PREFERRED EMBODIMENTS

Figure 1:
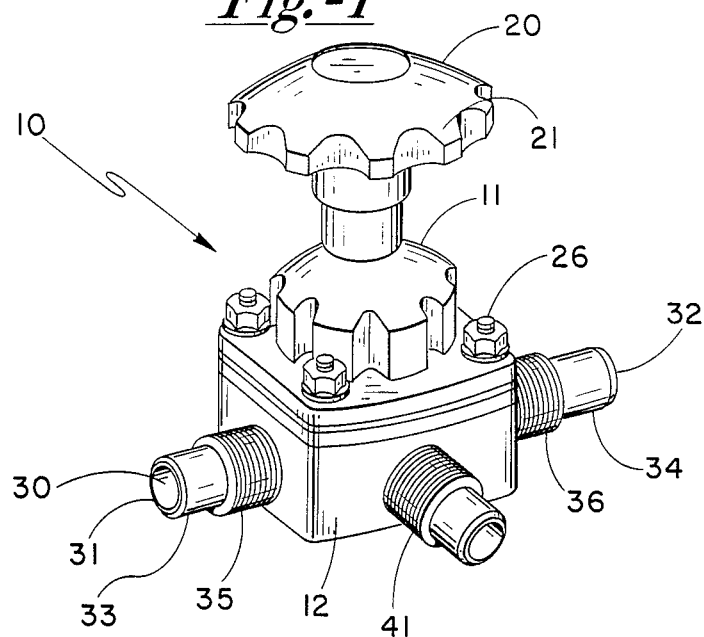
FIG. 1 is an assembly view of a manually operable weir valve incorporating the present invention.

As shown in FIG. 1, the weir valve is indicated in general by the reference numeral 10. The valve 10 includes an upper valve body portion 11 and a lower weir valve body portion 12 which together define the valve housing.

A manual operator 20 is mounted on the upper body portion 11 and includes a hand grip 21, a stem 22 threaded into the upper body, and a compressor 23 on the stem 22 and to be raised and lowered as the stem and grip are turned. A lower portion 24 of the stem 22 is rotatably connected to the compressor 23 which is non-rotatable and vertically slidable in the upper body portion 11. The compressor 23 has a lower portion 25 attached to a diaphragm assembly 60 which includes a backing cushion 60.1 and a TFE (tetrafluoroethylene) diaphragm 61 which is to raise and lower as the grip 21 is turned.

The edges of the diaphragm assembly are clamped between the peripheral portions of the upper and lower body portions 11 and 12. The upper valve body portion 11 is secured to the lower body portion 12 by four bolts 26.

The integral lower body portion 12 includes a main flow passage 30 opening to the exterior through two ports 31, 32. The lower housing portion 12 has protruding connecting portions 33, 34 which form the respective portions 31, 32 and which are adapted for connecting to pipes or tubing. The connecting portions may be threaded at 35, 36. Of course, connecting portions may be provided with other devices for attaching to pipes or tubes.

The lower valve body portion 12 also has a flow port 43 opening to the exterior through a protruding connecting portion 41. The connecting portion 41 includes a smooth surfaced water end 42 and a threaded section 44. Of course, other types of connector devices may be provided on the connection portion 41. Weir body portion 12 includes an upper face 45 against which the diaphragm is clamped.

The open interior 48 is divided into two chambers 50 and 51 by a weir 52 which traverses the open interior. The weir extends along and has a side face 49 which defines one side of the passage 30 extending through the lower body portion. The chamber 50 also comprises a portion of the passage 30.

Chamber 51 is in open comunication with flow port 43 to accommodate flow therebetween.

The top edge or surface 53 of weir 52 forms a valve seat as the diaphragm traverses and lies against the weir. The valve seat 53 may be formed in a number of configurations, such as those illustrated in FIG. 4 and 53, FIG. 5 at 72, and in FIG. 6 at 74.

The upper body portion 11 has a hood portion 46 which confines the stem 22 and compressor 23. The diaphragm assembly 60 separates the interior 47 of the hood from the open interior 48 of the valve housing.

Figure 2:
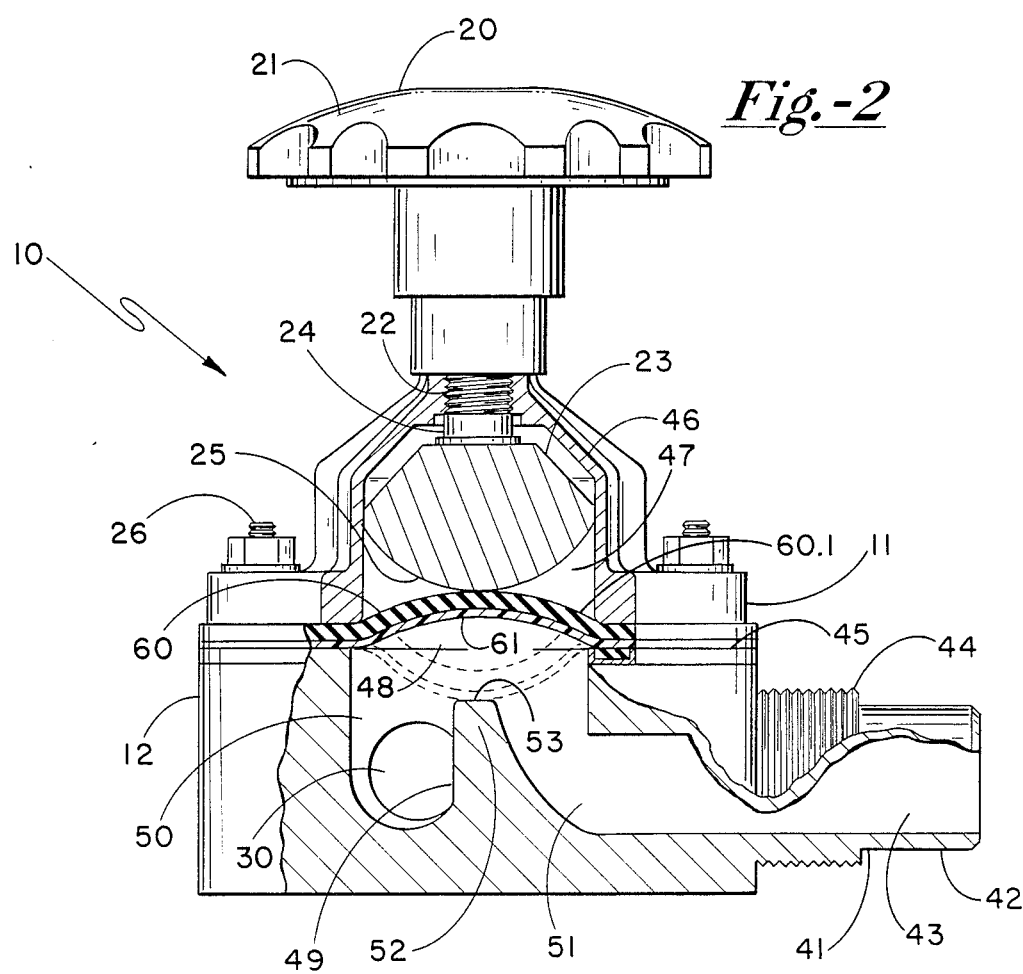
FIG. 2 is a section view of the valve shown in FIG. 1.

When the diaphragm 61 is brought to bear against the weir at seat 53 by the compressor 23, as shown in dotted lines in FIG. 2, there is no flow of fluid between chambers 50 and 51 or between passage 30 and port 43. It should be noted that the diaphragm assembly 60 may be partially depressed by the compressor 23 to merely approach but not contact weir seat 53 so as to partially close the valve 10. It should further be noted that the valve 10 is operable when the handle 21 and passage 30 and port 43 are disposed in any direction such as in an upright, upside down, or oblique orientation.

In operation, when the diaphragm 61 bears against the weir seat 53 of the weir 52, the weir valve 10 is normally closed. In the closed position, fluid in the passage 30 flows along and brings fluid pressure to bear against the diaphragm 61, regardless of the direction of fluid flow in passage 30. The weir valve 10 is thereby reversible to allow fluid flow in either direction in passage 30.

When it is desired to take a sample from fluid flowing in passage 30, the hand grip 21 is turned to raise the compressor 23 and the diaphragm assembly 61, which is retracted away from the weir seat 53 as the compressor 23 is raised. As the diaphragm 61 is lifted off the weir seat 53, fluid flows from opening 50, across the weir seat 53 and into opening 51, and port 43 for sampling. When a sample of a sufficient volume has been collected from port 43, the hand grip 21 is turned down to bring the diaphragm 61 to bear against weir seat 53 by the lower portion 25 of the compressor 23 to seal the passage 30 from port 43.

When it is desired to inject a fluid or supplement from the port 43 into the passage 30, the fluid in port 43 must be put under some pressure so that the fluid from port 43 bears against diaphragm 61. Subsequently, the hand grip 21 is turned so that the diaphragm 61 is retracted away from weir seat 53 to allow fluid flow from port 43 and opening 51, across weir seat 53, and into passage 30. The supplement fluid from port 43 will mix immediately with the fluid flow in passage 30. When a sufficient amount of fluid has been injected into passage 30, the hand grip 21 is again turned so that the compressor 23 presses the diaphragm 61 against the weir seat 53 to seal the passage 30 from port 43.

FIGS. 5–6 show alternate forms of weir. In FIG. 5, a weir seat 71 includes a flat bottom surface 72 with canted end 73. FIG. 6 shown an angular or V-shaped weir seat 74. The compressor 23 is tailored to conform to the above variations so that the diaphragm 61 may be sealingly pressed to the corresponding seat 72, 74.

FIG. 7 shows a power actuated operator 80 with a solenoid 81. The operator 80 is adaptable for connection to the lower valve body portion 12 of the valveng 10 shown in FIGS. 1–3. The operator 80 and solenoid 81 operate a compressor 82 and diaphragm 83 which are similar to compressor 24 and diaphragm 60 shown in FIGS. 1–3.

It should be noted that the valve body 12 may be formed of any of a number of materials including but not limited to perfluoroalkoxy resin (PFA), polyvinylidene fluoride (PVDF), polyvinyl chloride (PVC), polypropylene (PP) or stainless steel. The diaphragm 61 may be formed of polytetrafluoroethylene (PTFE) with a backing cushion 60.1 formed of Viton or a rubber-like fluoroelastomer.

The present invention may be embodied in other specific forms without departing from the spirit or essential attributes thereof, and it is therefore desired that the present embodiment be considered in all respects as illustrative and not restrictive, reference being made to the appended claims rather than to the foregoing description of indicate the scope of the invention.

We claim:
1. A weir valve for fluids comprising
a valve housing having an open interior and (a) an elongate weir traversing the open interior and dividing the interior into first and second chambers at opposite sides of the weir, said second chamber being elongate and extending along the weir, said second chamber having opposite end portions and being substantially free of obstructions to fluid flow longitudinally therethrough,
operating means including a diaphragm having a portion lying across the weir to prevent fluid flow over the weir and between the chambers,
the housing having a flow port communicating with said first chamber and a pair of fluid flow ports respectively communicating with said second chamber at said opposite end portions.
2. A weir valve according to claim 1 wherein said weir has a top surface against which the diaphragm bears, said top surface being concavely shaped relatively to the confronting diaphragm.
3. A weir valve according to claim 1 wherein said second chamber and said pair of flow ports cooperate to define a flow passage extending along the weir.

* * * * *

REEXAMINATION CERTIFICATE (2523rd)

United States Patent [19]

Chinnock et al.

[11] B1 4,977,929

[45] Certificate Issued  Apr. 4, 1995

[54] WEIR VALVE SAMPLING/INJECTION PORT

[75] Inventors: Robert T. Chinnock, Victoria; Jeffrey J. McKenzie, Watertown, both of Minn.

[73] Assignee: Fluoroware, Inc., Chaska, Minn.

Reexamination Request:
No. 90/003,251, Nov. 9, 1993

Reexamination Certificate for:
Patent No.: 4,977,929
Issued: Dec. 18, 1990
Appl. No.: 372,647
Filed: Jun. 28, 1989

[51] Int. Cl.⁶ ............................................. F16K 7/12
[52] U.S. Cl. ................................... 137/863; 251/331
[58] Field of Search ............... 137/863, 897; 251/61.1, 251/331

[56] References Cited

U.S. PATENT DOCUMENTS

| | | |
|---|---|---|
| 2,918,089 | 12/1959 | McFarland, Jr. . |
| 2,989,282 | 6/1961 | White . |
| 3,075,740 | 1/1963 | McIntosh . |
| 4,596,268 | 6/1986 | Jonas . |
| 4,653,526 | 3/1987 | Hoiss .......................... 251/331 X |

FOREIGN PATENT DOCUMENTS

633144 10/1927 France ........................ 251/331
62-151676 7/1987 Japan .

OTHER PUBLICATIONS

GF, product brochure, "Process Controls", (undated).
Posacon, product brochure, "Membranventile PFA—System", 14 pages (undated).
ITT Fluid Products Corporation, product brochure, "Advantage ITT Engineered Valves", 4 pages (undated).
ITT Engineered Valves, Unit of ITT Fluid Tech. Corp., brochure, "Diaphragm Valves for Sanitary Systems" 16 pages (undated).
Saunders, product brochure, "Saunders Pneumatic Valve Actuators", 40 pages (undated).
Saunders, product brochure, "Saunders Diaphragm, Check and Butterfly Valves", 16 pages (pp. 1–11 and 4 covers) (undated).
Armaturen in Kunststoff und Metal, product brochure, "Plastic and Metal—Valves and Flowmeters", 7 pages (undated).

*Primary Examiner*—John Fox

[57] ABSTRACT

The present weir valve includes a weir disposed along a flow passage. A port at the other side of the weir is open to the flow passage when the diaphragm is lifted off the weir.

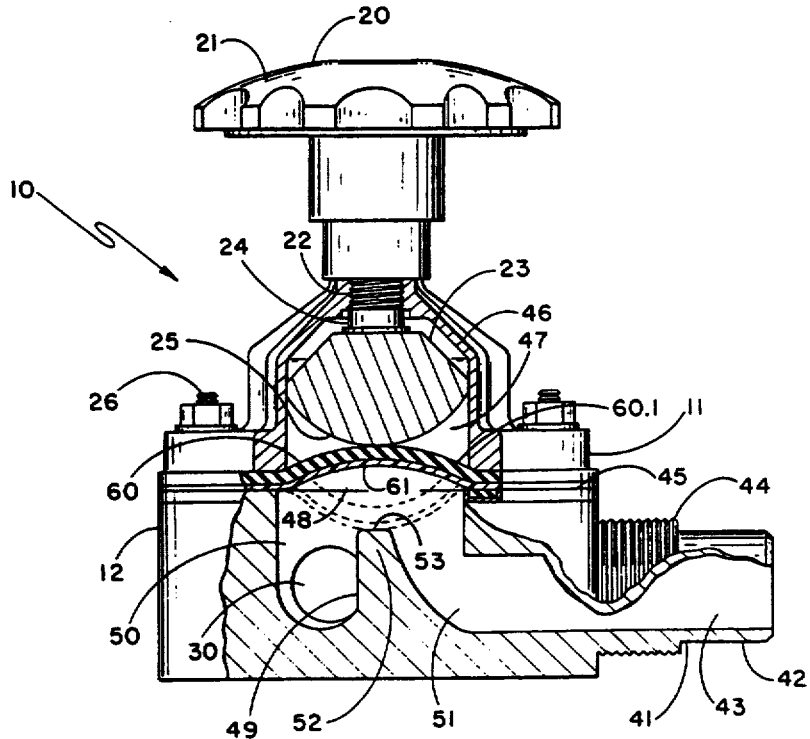

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2 and 3 are cancelled.

* * * * *